3,004,971
HALOACETATE METHOD FOR PREPARING THIAMORPHOLINEDIONES

Glenn S. Skinner, Newark, Del., and John B. Bicking, Lansdale, Pa., assignors, by direct and mesne assignments, to Merck & Co., Inc., Rahway, N.J., a corporation of New Jersey
No Drawing. Filed Apr. 27, 1956, Ser. No. 580,984
6 Claims. (Cl. 260—243)

This invention is concerned with a novel process for preparing new derivatives of thiamorpholinedione which can be illustrated by the following structural formula

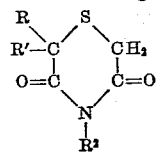

wherein R is a lower alkyl radical, either straight (i.e. continuous) or branched chain, such as methyl, propyl, amyl, isoamyl, heptyl, and the like; R' is a lower alkyl radical, either straight or branched chain, such as those illustrated above for R, an aryl radical, either unsubstituted or substituted by one or more halogen, alkoxy or alkyl radicals; $R^2$ is hydrogen or a lower alkyl or lower alkenyl radical, either straight or branched chain, such as a methyl, propyl, allyl, isobutyl, amyl and the like, an aralkyl, for example, a benzyl, cinnamyl and the like radicals, an acyl, derived from an aliphatic or an aromatic carboxylic acid, such as an acetyl, propionyl, benzoyl and the like.

The compounds which are prepared by the process of this invention are described in our copending U.S. patent application Serial No. 430,976, filed May 19, 1954, now Patent 2,786,838, issued March 26, 1957, of which this application is in part a continuation. The thiamorpholinediones prepared by the method of this invention are useful chemotherapeutic agents, and are particularly useful as hypnotic agents, while some of them have marked anticonvulsant properties. Especially marked activity has been observed in the compounds illustrated by the structure above wherein R is an alkyl radical and R' is an alkyl or an aryl radical and $R^2$ is hydrogen or an alkyl radical. Among compounds of these types, those having particularly high activity both as hypnotic agents and as anti-convulsant agents are 2,2 - diethyl - 3,5 - thiamorpholinedione, 2,2-diethyl-4-methyl-3,5-thiamorpholinedione, 2-ethyl-2-butyl-3,5-thiamorpholinedione, and 2-ethyl-2-phenyl-3,5-thiamorpholinedione.

The novel method of this invention comprises reacting an α,α-disubstituted-α-bromoacetyl bromide with thiourea to form a 5,5-disubstituted-2-imino-4-thiazolidone, which is then hydrolyzed to give a mixture of an α,α-disubstituted-α-mercaptoacetic acid and the corresponding α,α-disubstituted-α-mercaptoacetamide. This mixture of mercapto compounds is then reacted with an alkyl ester of a haloacetic acid to form the monoalkyl ester of the α,α-disubstituted-thiodiacetic acid as well as the alkyl ester of its monoamide. The compounds resulting from this reaction can be separated by treatment with an alkaline solution in which the amide is insoluble. The alkyl ester of the α,α-disubstituted-thiodiacetic acid monoamide when heated with a strong mineral acid, e.g. hydrochloric acid, yields the 2,2-disubstituted-3,5-thiomorpholinedione directly. The alkyl ester of the α,α-disubstituted-thiodiacetic acid can be converted to its monoamide by treatment with thionyl chloride and then ammonia. This monoamide can be converted to the 2,2-disubstituted-3,5-thiamorpholinedione by the treatment described above. Or, the alkyl ester of the α,α-disubstituted-thiodiacetic acid monoamide can be hydrolyzed by treatment with acidic or basic aqueous solutions to the α,α-disubstituted-thiodiacetic acid which upon treatment with ammonia or an amine followed by pyrolysis of the salt forms the desired 2,2-disubstituted- or 2,2,4-trisubstituted-3,5-thiamorpholinediones. Alternatively, the alkyl ester of the α,α-disubstituted-thiodiacetic acid monoamide can be hydrolyzed in acidic or basic aqueous solutions to give the monoamide of the α,α-disubstituted-thiodiacetic acid which can be converted to the 2,2-disubstituted-3,5-thiamorpholinedione by pyrolysis.

METHOD

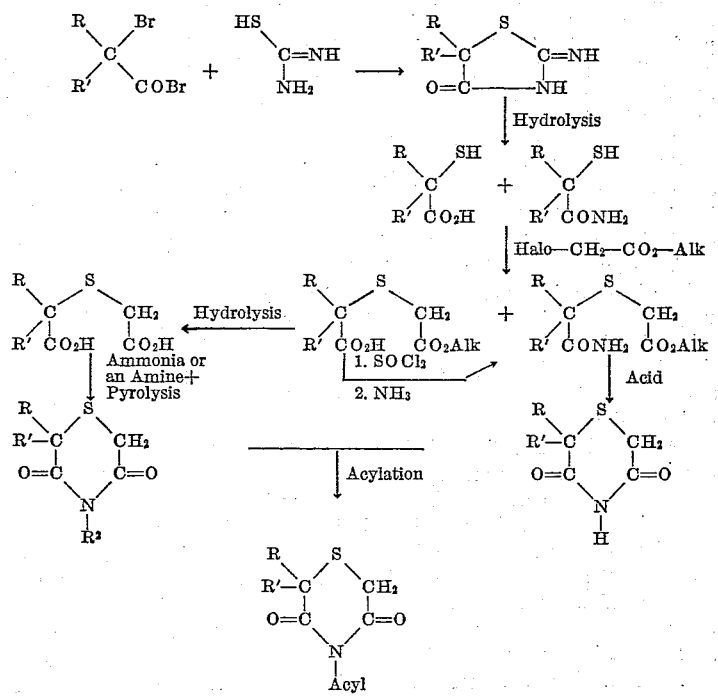

The starting material in the above process is an α,α-disubstituted-α-bromoacetyl bromide. The preparation of these compounds is well known, and substantially all of the compounds employed as starting materials have previously been described in the literature. In general, they are prepared by reacting an α,α-disubstituted acetic acid with thionyl chloride to form the corresponding α,α-disubstituted-acetyl chloride, which is then brominated to form α,α-disubstituted-α-bromoacetyl bromide.

The first step in the method described above, the conversion of the α,α-disubstituted-α-bromoacetyl bromide to the 5,5-disubstituted-2-imino-4-thiazolidone by reaction with thiourea, is a known reaction; however, the subsequent steps are new and provide a means whereby the ultimate thiamorpholinediones can be obtained in relatively high yield.

It has been found that, by hydrolyzing a 5,5-disubstituted-2-imino-4-thiazolidone in the presence of dilute sodium hydroxide or potassium hydroxide with heating, preferably under refluxing conditions, for from about 6 hours to 6 days, a very good yield of a mixture of α,α-disubstituted-α-mercaptoacetic acid and its amide is obtained. The duration of refluxing is determined upon the degree of conversion to the acid desired. Good results are most consistently obtained by refluxing the thiazolidone solution for about 1–2 days. The mercapto products obtained as a result of this hydrolysis are usually in the form of an oil. The oil need not be further purified, as it can be dissolved in an alkaline solution such as dilute sodium or potassium hydroxide solution or a sodium or potassium carbonate solution and the like and then treated with a lower alkyl haloacetate, such as a methyl, propyl or butyl ester of chloro-, bromo-, and iodoacetic acid. Acidification of this reaction mixture with a mineral or an organic acid causes to precipitate a mixture consisting of the selected alkyl ester of the α,α-disubstituted-thiodiacetic acid and its monoamide. These compounds are separated by treatment with an alkaline solution advantageously with sodium or potassium bicarbonate in which the monoamide is insoluble.

The alkyl ester of the α,α-disubstituted-thiodiacetic acid can be treated with thionyl chloride, phosphorus pentachloride or phosphorus trichloride and then ammonia to give the monoamide and the combined yield of the alkyl ester of the α,α-disubstituted-thiodiacetic acid monoamide then preferably is dissolved in a mixture of a strong mineral acid and an organic solvent preferably hydrochloric or sulfuric acid in a solvent such as acetic acid, dioxane, acetone and the like, and the solution refluxed to give the 2,2-disubstituted-3,5-thiamorpholinedione.

The alkyl ester also can be hydrolyzed to the corresponding diacetic acid and then reacted with ammonia or a substituted amine and in either case followed by heating the amidation product to form the desired 2,2-disubstituted-3,5-thiamorpholinedione or the desired 2,2,4-trisubstituted-3,5-thiamorpholinedione.

The hydrolysis advantageously can be effected by employing an acidic aqueous solution, such as a dilute mineral acid as dilute sulfuric or hydrochloric acid and the like or a basic aqueous solution such as dilute sodium or potassium hydroxide or dilute barium hydroxide and the like.

Reaction between the thiodiacetic acid and the ammonia or the amine readily occurs upon adding one reactant to the other. It will be understood that, when a substituted amine is used in this last step, the compound will have an alkyl, alkenyl or aralkyl radical attached to the nitrogen atom. If it is desired to have an acyl radical attached to this nitrogen atom, this can be accomplished by heating the 2,2-disubstituted-3,5-thiamorpholinedione with an acyl halide or an acid anhydride.

The following examples will describe in greater detail the method of this invention for the preparation of the novel thiamorpholinedione compounds.

*Example 1.—2,2-diethyl-3,5-thiamorpholinedione*

STEP A

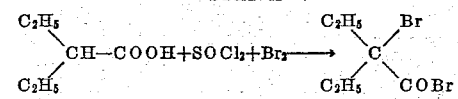

In a round-bottomed flask equipped with a dropping funnel and a condenser connected to an acid gas absorption trap was placed α-ethylbutyric acid (232 g., 2.0 moles). Thionyl chloride (262 g., 2.2 moles) was added dropwise over a period of 1 hour. The mixture was heated on a steam bath during the addition and for 1 hour longer. Then, with continued heating, bromine (320 g., 2.0 moles) was added in small portions as rapidly as it would react. The time required for the addition of bromine was about 5 hours. Distillation of the reaction mixture from a Claisen flask gave 331.5 g. of α-bromo-α-ethylbutyryl bromide, a yellowish oil, B.P. 82–88° C. (14 mm.).

STEP B

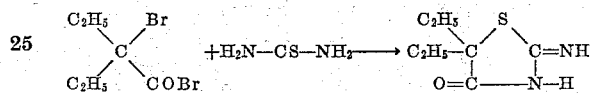

To a refluxing solution of thiourea (125 g., 1.65 mole) in acetic acid (600 cc.) in a 2-liter flask equipped with a condenser and dropping funnel, α-bromo-α-ethylbutyryl bromide (173 g., 0.55 mole) was added dropwise during 20 minutes. The mixture was refluxed for an additional 15 minutes, and then the acetic acid was removed by distillation at reduced pressure. To the residue was added water (500 cc.), and the mixture was neutralized by the addition of concentrated ammonium hydroxide solution. The gummy, yellow solid which precipitated was collected on a filter and washed with ether. It was recrystallized from a water-ethanol mixture to give 5,5-diethyl-2-imino-4-thiazolidone.

STEP C

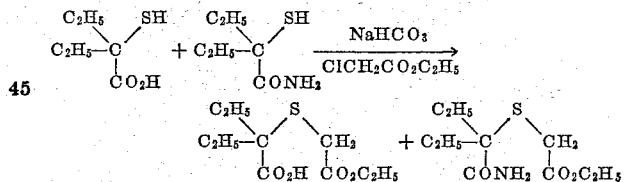

The 5,5-diethyl-2-imino-4-thiazolidone was hydrolyzed to the mixture of mercapto products by dissolving it in 15% sodium hydroxide and refluxing for 72 hours.

The mixture of these mercapto compounds was dissolved in 400 cc. of saturated sodium bicarbonate solution. Ethyl chloroacetate (22.0 g., 0.18 mole) was added, and the mixture shaken for 30 minutes until homogeneous. The solution was acidified to precipitate an oily mixture of the products. The oil was taken up in ether. The ether solution was extracted with 300 cc. of saturated sodium bicarbonate solution. When the extract was acidified α,α-diethyl-α-carbethoxymethylmercaptoacetic acid precipitated as an oil. Evaporation of the ether solution left the α,α-diethyl-α-carbethoxymethylmercaptoacetamide as a viscous oil.

STEP D

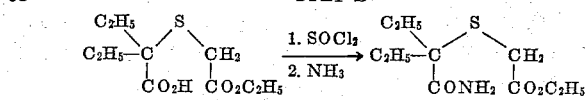

α,α-Diethyl-α-carbethoxymethylmercaptoacetic acid (23.4 g., 0.1 mole) was dissolved in 30 cc. of thionyl chloride and the solution was refluxed for 45 minutes. Excess thionyl chloride was distilled in vacuo. The oily residue was poured into 50 cc. of ice-cold concentrated ammonium hydroxide solution. The resulting oily product was taken up in ether and dried over sodium sulfate. After evaporation of the ether there was obtained 17.8 g. (76%) of α,α-diethyl-α-carbethoxymethylmercaptoacetamide, a brown viscous oil.

STEP E

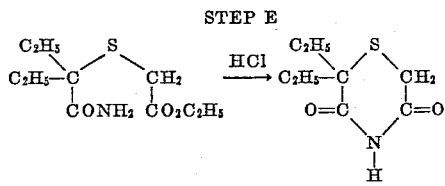

α,α - Diethyl - α - carbethoxymethylmercaptoacetamide (17.8 g., 0.076 mole) was dissolved in 40 cc. of concentrated hydrochloric acid and the solution was heated at 100° C. for 30 minutes. The solution was chilled to precipitate the crystalline product which was recrystallized from an isopropyl alcohol-water mixture to give 7.7 g. (55%) pure 2,2-diethyl-3,5-thiamorpholinedione, M.P. 85–86° C.

*Example II.—2,2-diethyl-3,5-thiamorpholinedione*

STEP A

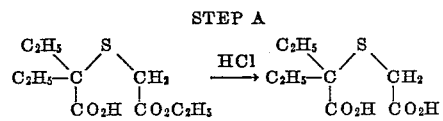

α,α - Diethyl - α-carbethoxymethylmercaptoacetic acid, prepared as described in Example I, Steps A–C, was added to a 10% solution of hydrochloric acid and refluxed for 2 hours. Upon cooling α,α-diethylthiodiacetic acid precipitated and was separated by filtration.

STEP B

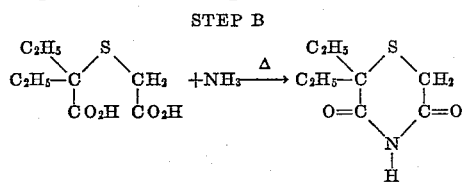

The ammonium salt of the thus obtained thiodiacetic acid was prepared by dissolving the α,α-diethyl-thiodiacetic acid in ether and adding a 10% solution of ammonia in ethanol. The precipitated salt was collected, dried, and packed into a 25 cc. Claisen flask, fitted with a capillary boiling tube and having a receiver fused to the side arm. The salt was heated by means of a metal bath at 190° C. for 1¼ hours under a pressure of 60 mm. Hg. The pressure was then lowered to 30 mm. and the bath temperature raised to 220° C., whereupon the imide slowly distilled into the receiver. It was obtained as a yellowish, poorly crystalline substance. This crude product was dissolved in a hot mixture of water (40 cc.) and isopropyl alcohol (18 cc.). The solution, which was acidic, was neutralized by the addition of 5% sodium bicarbonate solution (12 cc.). When the solution was chilled, a crystalline product separated which was recrystallized from a mixture of water and isopropyl alcohol (2:1) yielding pure 2,2-diethyl-3,5-thiamorpholinedione, M.P. 85–86° C.

*Example III.—2,2-diethyl-4-methyl-3,5-thiamorpholinedione*

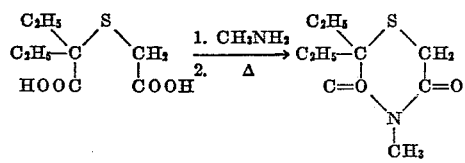

To a solution of α,α-diethylthiodiacetic acid prepared as described in Example II, Step A, in ether was added a 33% solution of methylamine in ethanol. The precipitated methylammonium salt of α,α-diethylthiodiacetic acid was collected, dried, and placed in a 50 cc. Claisen flask. It was heated at 190° C. for 40 minutes under a pressure of 40 mm. Hg. The bath temperature was then raised to 220° C. and the pressure lowered to 25 mm. The product distilled. There was obtained 8.6 g. of a yellow oil. The oil was shaken with concentrated ammonium hydroxide solution (20 cc.). The insoluble oil was taken up in ether, dried and redistilled to give 4.6 g. (35%) of 2,2-diethyl-4-methyl-3,5-thiamorpholinedione, a colorless, mobile oil, B.P. 148–149° C. (16 mm.), $n_D^{24}$ 1.5184.

*Example IV.—2,2,4-triethyl-3,5-thiamorpholinedione*

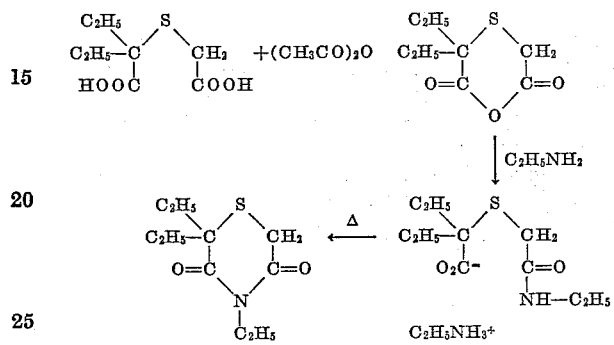

A solution of α,α-diethylthiodiacetic acid prepared as described in Example II, Step A, in acetic anhydride was refluxed for 2 hours, and then distilled yielding α,α-diethylthiodiacetic anhydride, B.P. 149–151° C. (15 mm.). The anhydride thus obtained was dissolved in ether (150 cc.) and a solution of ethylamine (20 cc.) in ether (100 cc.) was added slowly with ice-bath cooling. The precipitated ethylammonium salt of α,α-diethyl-α-(N-ethylcarbamylmethylmercapto)-acetic acid was placed in a 125 cc. Claisen flask and heated at 180–200° C. for 30 minutes under a pressure of 40 mm. Hg. The bath temperature was then raised to 250° C. and the pressure lowered to 16 mm. The product distilled yielding an orange oil. The oil was shaken with 50 cc. of concentrated ammonium hydroxide. The insoluble fraction was taken up in ether and redistilled to give 2,2,4-triethyl-3,5-thiamorpholinedione, B.P. 146–148° C. (15 min.), $n_D^{25}$ 1.5082.

*Example V.—2,2-diethyl-4-allyl-3,5-thiamorpholinedione*

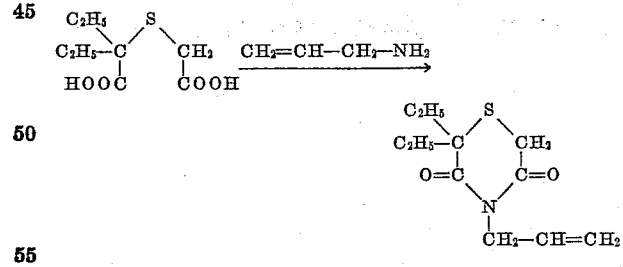

By replacing the ethylamine employed in Example IV with an equivalent quantity of allylamine, and following substantially the same procedure described in Example IV, there was obtained 2,2-diethyl-4-allyl-3,5-thiamorpholinedione, B.P. 160–161° C. (16 mm.).

*Example VI.—2,2-diethyl-4-benzyl-3,5-thiamorpholinedione*

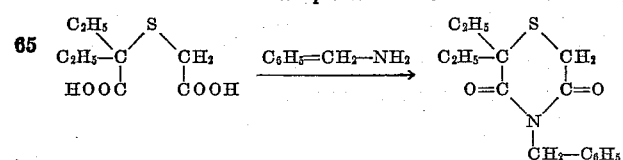

By replacing the ethylamine employed in Example IV with an equivalent quantity of benzylamine, and following substantially the same procedure described in Example IV, there was obtained 2,2-diethyl-4-benzyl-3,5-thiamorpholinedione, B.P. 173° C. (3 mm.).

Example VII.—2,2-diethyl-4-cinnamyl-3,5-thiamorpholinedione

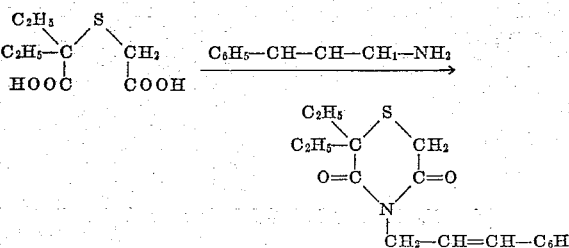

By replacing the ethylamine employed in Example IV with an equivalent quantity of cinnamylamine, and following substantially the same procedure described in Example IV there was obtained 2,2-diethyl-4-cinnamyl-3,5-thiamorpholinedione.

Example VIII.—2,2-diethyl-4-acetyl-3,5-thiamorpholinedione

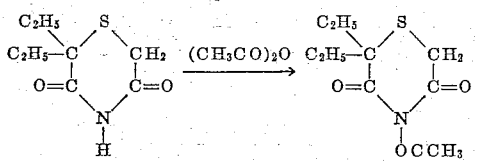

A solution of 2,2-diethyl-3,5-thiamorpholinedione, obtained as described in Example I, in an excess of acetic anhydride was heated under reflux conditions for 4 days yielding 2,2-diethyl-4-acetyl-3,5-thiamorpholinedione.

Example IX.—2,2-diethyl-4-benzoyl-3,5-thiamorpholinedione

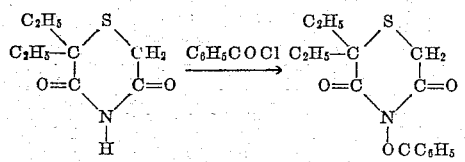

A solution of 2,2-diethyl-3,5-thiamorpholinedione, obtained as described in Example II, and an excess of benzoyl chloride in pyridine was refluxed for 4 days yielding 2,2-diethyl-4-benzoyl-3,5-thiamorpholinedione.

Example X.—2-ethyl-2-phenyl-3,5-thiamorpholinedione

STEP A

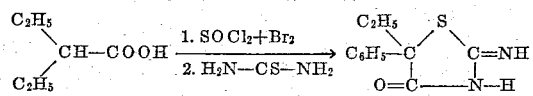

In a one-liter round-bottomed flask equipped with a dropping funnel and a condenser connected to an acid gas absorption trap was placed α-phenyl-butyric acid (170 g., 1.04 moles). Thionyl chloride (137 g., 1.15 moles) was added dropwise over a period of 1 hour. The mixture was heated on a steam bath during the addition. Then, with continued heating, bromine (166 g., 1.04 moles) was added in small portions as rapidly as it would react. The time required for the addition of the bromine was 6 hours. Nitrogen was then bubbled through the mixture for a few minutes to remove dissolved hydrogen chloride and any excess bromine. The product was added dropwise during 20 minutes to a refluxing solution of thiourea (228 g., 3.0 moles) in acetic acid (950 cc.) in a two-liter round-bottomed flask equipped with a dropping funnel and condenser. The mixture was refluxed for an additional 15 minutes, and then the acetic acid was removed by distillation at reduced pressure. To the oily residue was added water (500 cc.). The insoluble oil was removed by extraction with ether. The aqueous solution was made neutral by the addition of concentrated ammonium hydroxide solution. The crystalline precipitate was collected on a Buchner funnel and washed with two 50 cc. portions of ether. It was recrystallized from isopropyl alcohol to give 116.5 g. (51%) of 5-ethyl-5-phenyl-2-imino-4-thiazolidone, M.P. 208–210° C.

STEP B

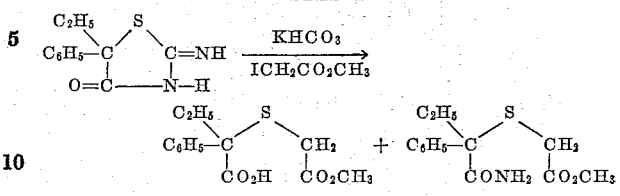

A solution of the thus obtained 5-ethyl-5-phenyl-2-imino-4-thiazolidone (8.0 g., 0.0365 mole) in 5% sodium hydroxide solution (120 cc.) was refluxed for 92 hours. The solution was cooled and acidified with concentrated sulfuric acid. The oily product which separated was taken up in ether. The ether was evaporated and the residual oil was added to saturated potassium bicarbonate solution (400 cc.). Methyl iodoacetate was added and the mixture shaken until homogeneous. The solution was acidified to precipitate an oily mixture of the products. The oil was taken up in ether and the solution then was extracted with 300 cc. of saturated potassium bicarbonate solution. Upon acidification, α-ethyl-α-phenyl-α-carbomethoxymethylmercaptoacetic acid separated as an oil, which was removed and set aside for use in Example XI. Evaporation of the ether solution left α-ethyl-α-phenyl-α-carbomethoxymethylmercaptoacetamide in the form of an oil.

STEP C

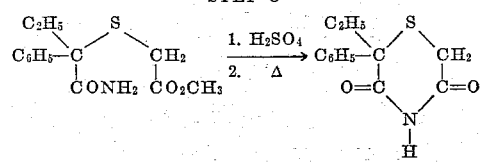

α-Ethyl-α-phenyl-α-carbomethoxymethylmercaptoacetamide was dissolved in a mixture of dioxane and 20% sulfuric acid and the solution heated at 100° C. for 1 hour. The reaction mixture was chilled to precipitate 2-ethyl-2-phenyl-3,5-thiamorpholinedione which, after recrystallization from isopropyl alcohol, melted at 111–113° C.

Example XI.—2-ethyl-2-phenyl-4-amyl-3,5-thiamorpholinedione

STEP A

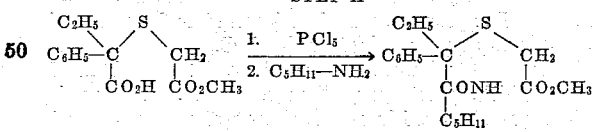

α-Ethyl-α-phenyl-α-carbomethoxymethylmercaptoacetic acid obtained in Step B of Example X, was heated at 100° C. for 30 minutes with phosphorus pentachloride. The excess phosphorus pentachloride was distilled in vacuo and the residue added to ice-cold amylamine. The resulting product was taken up in ether and dried over sodium sulfate. Evaporation of the ether yielded N-amyl-α-ethyl-α-phenyl-α-carbomethoxymethylmercaptoacetamide.

STEP B

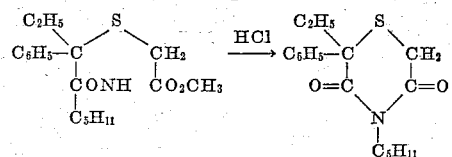

The thus obtained N-amyl-α-ethyl-α-phenyl-α-carbomethoxymethylmercaptoacetamide was dissolved in concentrated hydrochloric acid and the solution heated at 100° C. for 1 hour. The solution was chilled to precipitate 2-ethyl-2-phenyl-4-amyl-3,5-thiamorpholinedione.

Example XII.—2,2-diethyl-4-benzyl-3,5-thiamorpholinedione

STEP A

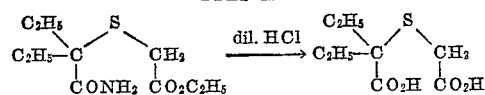

α,α-Diethyl - α - carbethoxymethylmercaptoacetamide, prepared as described in Example I, Steps A–C, was dissolved in a mixture of acetic acid and 20% hydrochloric acid. The solution was heated under reflux conditions for approximately 2 days. Upon cooling and evaporation there was obtained α,α-diethylthiodiacetic acid.

STEP B

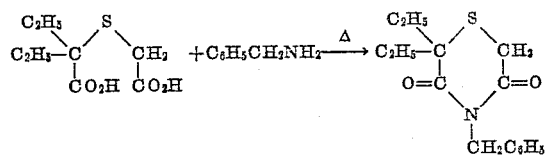

This product was dissolved in ether and there then was added a mixture of benzylamine and alcohol. The precipitated benzylammonium salt of α,α-diethyl-thiodiacetic acid was collected, dried, placed in a 50 cc. Claisen flask and heated at about 180° C. for about 1 hour under a pressure of 60 mm. Hg. The product was distilled in a heating bath adjusted to 260° C. at oil pump pressure. An orange viscous oil distilled and upon redistillation 2,2-diethyl-4-benzyl-3,5-thiamorpholinedione was obtained as a yellow oil, B.P. 173° C. (3 mm.), $n_D^{25}$ 1.5573.

The symbol, Δ, used in some of the reaction formulae above indicates that the reaction takes place with heating.

The term oil pump pressure used in the foregoing examples indicates pressures in the range of from about 1 to 5 millimeters.

While the invention has been illustrated by particular methods for the preparation of 2,2-disubstituted-3,5-thiamorpholinedione and 2,2,4-trisubstituted-3,5-thiamorpholinedione compounds, the invention embraces modifications of the methods described for their synthesis as well as for the preparation of chemical equivalents of the specifically identified compounds.

What is claimed is:

1. In the process for preparing a 2-R2-R1-3,5-thiamorpholinedione suitable for use as a chemotherapeutic agent wherein R is lower alkyl; R1 is selected from the class consisting of lower alkyl and mononucleararyl; the steps comprising causing a mixture of α-R-α-R1-α-mercaptoacetic acid and α-R-α-R1-α-mercaptoacetamide to react with a lower alkyl ester of monohaloacetic acid yielding a mixture of a mono-lower alkyl ester of α-α-disubstituted-thiodiacetic acid and a lower alkyl ester of α,α-disubstituted-α-carboxymethylmercaptoacetamide, separating the reaction products and then heating the alkyl ester of α,α - disubstituted-α-carboxymethylmercaptoacetamide with a strong mineral acid yielding the corresponding 2,2-disubstituted-3,5-thiamorpholinedione.

2. A process as claimed in claim 1, wherein the mixture of the monoalkyl ester of α,α-disubstituted-thiodiacetic acid and the alkyl ester of α,α-disubstituted-α-carboxymethylmercaptoacetamide is separated by dissolving the monoalkyl ester of αα-disubstituted-thiodiacetic acid in an alkaline solution.

3. A process as claimed in claim 1, wherein the mixture of the monoalkyl ester of α,α-disubstituted-thiodiacetic acid and the alkyl ester of α,α-disubstituted-α-carboxymethylmercaptoacetamide is separated by dissolving the monoalkyl ester of αα-disubstituted-thiodiacetic acid in an alkaline solution selected from the class consisting of aqueous sodium bicarbonate and potassium bicarbonate.

4. A process as claimed in claim 1, wherein the alkyl ester of α,α-disubstituted-α-carboxymethylmercaptoacetamide is heated with a mixture of an organic solvent for the amide and a strong mineral acid to form the corresponding 2,2-disubstituted-3,5-thiamorpholinedione.

5. A process as claimed in claim 1, wherein the alkyl ester of α,α-disubstituted-α-carboxymethylmercaptoacetamide is heated with concentrated hydrochloric acid to form the corresponding 2,2-disubstituted-3,5-thiamorpholinedione.

6. In the process for preparing 2-ethyl-2-phenyl-3,5-thiamorpholinedione the steps comprising causing a mixture of α-ethyl-α-phenyl-α-mercaptoacetic acid and α-ethyl-α-phenyl-α-mercaptoacetamide to react with a lower alkyl ester of monohaloacetic acid yielding a mixture of the monoalkyl ester of α-ethyl-α-phenyl-thiodiacetic acid and the alkyl ester of α-ethyl-α-phenyl-α-carboxymethylmercaptoacetamide, separating the reaction products by dissolving the monoalkyl ester of α-ethyl-α-phenylthiodiacetic acid in an alkaline solution and then heating the alkyl ester of α-ethyl-α-phenyl-α-carboxymethylmercaptoacetamide with concentrated hydrochloric acid to form 2-ethyl-2-phenyl-3,5-thiamorpholinedione.

References Cited in the file of this patent

UNITED STATES PATENTS

| | | |
|---|---|---|
| 2,468,426 | Cheney et al. | Apr. 26, 1949 |
| 2,755,278 | Goldberg et al. | July 17, 1956 |
| 2,786,838 | Skinner et al. | Mar. 26, 1957 |

FOREIGN PATENTS

| | | |
|---|---|---|
| 472,320 | Canada | Mar. 20, 1951 |

OTHER REFERENCES

Heintz: Annalen der Chem. und Pharm., vol. 128, pp. 134–150, (1863).

Clemmensen et al.: Amer. Chem. Jour., 1908, vol. 40, pp. 280–302, pp. 285, 286, 297 and 298 in particular.

Hellstrom: Z. physk. Chem., A, vol. 157, pp. 242–68 (1931).

Beil: Handbuch der Org. Chem., vol. 27, p. 249, 1937, 4th ed.

Fieser et al.: Organic Chem., 2nd ed. (1950), pp. 182–4 (D. C. Heath and Co., Boston).